United States Patent
Sengar et al.

(10) Patent No.: US 8,033,116 B2
(45) Date of Patent: Oct. 11, 2011

(54) TURBOMACHINE AND A METHOD FOR ENHANCING POWER EFFICIENCY IN A TURBOMACHINE

(75) Inventors: Ajit Singh Sengar, Bangalore (IN); Nattanmai Venkataraman Saravanan, Chennai (IN); Aslam Basha, Bangalore (IN)

(73) Assignee: General Electric Company, Schenectady, NY (US)

( * ) Notice: Subject to any disclaimer, the term of this patent is extended or adjusted under 35 U.S.C. 154(b) by 792 days.

(21) Appl. No.: 12/115,634

(22) Filed: May 6, 2008

(65) Prior Publication Data
US 2009/0277184 A1  Nov. 12, 2009

(51) Int. Cl.
*F02C 3/30* (2006.01)
*F02C 6/08* (2006.01)
*F02C 7/16* (2006.01)

(52) U.S. Cl. .............. 60/775; 60/785; 60/806; 60/39.53
(58) Field of Classification Search .................... 60/782, 60/785, 806, 39.53, 775; 415/115, 116, 117
See application file for complete search history.

(56) References Cited

U.S. PATENT DOCUMENTS

| | | | |
|---|---|---|---|
| 3,693,347 A | 9/1972 | Kydd et al. | |
| 3,747,336 A | 7/1973 | Dibelius et al. | |
| 4,969,324 A * | 11/1990 | Woodson | 60/775 |
| 5,054,279 A | 10/1991 | Hines | |
| 5,340,274 A * | 8/1994 | Cunha | 415/115 |
| 5,459,994 A * | 10/1995 | Drnevich | 60/783 |
| 5,697,209 A * | 12/1997 | Wettstein | 60/39.53 |
| 5,873,238 A * | 2/1999 | Bellows | 60/39.182 |
| 5,930,990 A | 8/1999 | Zachary et al. | |
| 6,279,312 B1 | 8/2001 | Hennecke | |
| 6,343,462 B1 | 2/2002 | Drnevich et al. | |
| 6,397,578 B2 * | 6/2002 | Tsukamoto et al. | 60/39.53 |
| 6,398,518 B1 | 6/2002 | Ingistov | |
| 6,446,440 B1 | 9/2002 | Ranasinghe et al. | |
| 6,487,863 B1 * | 12/2002 | Chen et al. | 60/782 |
| 6,502,403 B1 | 1/2003 | Tazaki et al. | |
| 6,584,779 B2 * | 7/2003 | Priestley | 60/782 |
| 6,820,430 B1 | 11/2004 | Tassone et al. | |
| 7,587,887 B2 * | 9/2009 | Horiuchi et al. | 60/806 |
| 2004/0123602 A1 * | 7/2004 | Bunker et al. | 60/806 |
| 2004/0221584 A1 * | 11/2004 | Hoffmann et al. | 60/782 |

FOREIGN PATENT DOCUMENTS

| | | |
|---|---|---|
| EP | 1069282 | 1/2001 |
| EP | 0995069 | 10/2003 |
| JP | 2002-096299 | 3/2002 |
| WO | 2006123388 A2 | 11/2006 |

* cited by examiner

*Primary Examiner* — Ted Kim
(74) *Attorney, Agent, or Firm* — Cantor Colburn LLP

(57) ABSTRACT

A turbomachine includes a compressor portion that generates a cooling airflow. The compressor portion includes a plurality of compressor stages. The turbomachine further includes a turbine portion operatively connected to the compressor portion. The turbine portion includes a plurality of turbine stages. A conduit fluidly connects at least one of the plurality of compressor stages with at least one of the plurality of turbine stages and delivers a portion of the cooling airflow from the compressor portion to the turbine portion. An injector port is connected to the conduit and a secondary fluid generation system. The secondary fluid generation system delivers an amount of dry secondary fluid into the cooling airflow passing from the compressor portion to the turbine portion. The amount of dry secondary fluid replaces a portion of the cooling airflow passing to the turbine portion.

15 Claims, 3 Drawing Sheets

TURBOMACHINE AND A METHOD FOR ENHANCING POWER EFFICIENCY IN A TURBOMACHINE

BACKGROUND OF THE INVENTION

The present invention relates to the art of turbomachines and, more particularly, to a turbomachine and a method for enhancing power efficiency in a turbomachine.

Modern turbomachines achieve higher efficiencies and higher power output through the use of high adiabatic compression ratios of 20:1 or greater. High compression ratios lead to high efficiency and increased power output. Adiabatic compression is achieved using high efficiency axial flow compressors and is invariably accompanied by a temperature rise that leads to reduced compression efficiency. In order to reduce this temperature rise, air pre-cooling devices siphon off heat and thus partially offset any efficiency gains. Also, partially compressed air is extracted for cooling hot gas path components of combustion turbines. The work going into producing the cooling air is not transferred to the turbine and thus represents a further loss of efficiency. To address this lost work and increase power output, many modern day turbomachines employ external compressors that pump in more air or supply steam injection at a compressor discharge (CDC) diffuser exit or downstream of the diffuser exit. However, external compressors represent additional power consumers and thus create efficiency losses. While steam injection enhances heat transfer rates and boosts power output, high quality high pressure (HP) steam is required. The use of high quality HP steam has a negative impact on efficiency resulting from useful bottoming cycle heat loss. Moreover, by injecting the steam at the CDC diffuser exit or downstream thereof, airflow cooling offsets any gains that may be achieved in compressor efficiency. Also, injecting steam at this particular point in the turbomachine requires efficient combustion chamber mixing before ignition in order to mitigate any combustion degradation.

BRIEF DESCRIPTION OF THE INVENTION

A turbomachine constructed in accordance with an exemplary embodiment of the present invention includes a compressor portion that generates a cooling air flow. The compressor portion includes a plurality of compressor stages. The turbomachine further includes a turbine portion operatively connected to the compressor portion. The turbine portion includes a plurality of turbine stages. A conduit fluidly connects at least one of the plurality of compressor stages with at least one of the plurality of turbine stages. The conduit delivers a portion of the cooling air flow from the compressor portion to the turbine portion. An injector port is fluidly connected to the conduit and a secondary fluid generation system is fluidly connected to the injector port. The secondary fluid generation system delivers an amount of dry secondary fluid into the cooling air flow passing from the compressor portion to the turbine portion. The amount of dry secondary fluid replaces a portion of the cooling air flow passing to the turbine portion thereby lowering an amount of work required by the compressor needed for cooling.

In accordance with another exemplary embodiment of the present invention, a method of enhancing power efficiency in a turbomachine includes operating a compressor portion of the turbomachine to generate a cooling air flow. The compressor portion includes a plurality of compressor stages. The method further requires extracting the cooling air flow from one of the plurality of stages of the compressor portion and directing the cooling air flow into a turbine portion of the turbomachine. In addition, the method includes injecting a dry secondary fluid into the cooling airflow. The dry secondary fluid replaces a portion of the cooling airflow thereby lowering an amount of work required by the compressor portion needed for cooling the turbine portion and thus enhancing power efficiency of the turbomachine.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

DETAILED DESCRIPTION OF THE INVENTION

Figure 1:
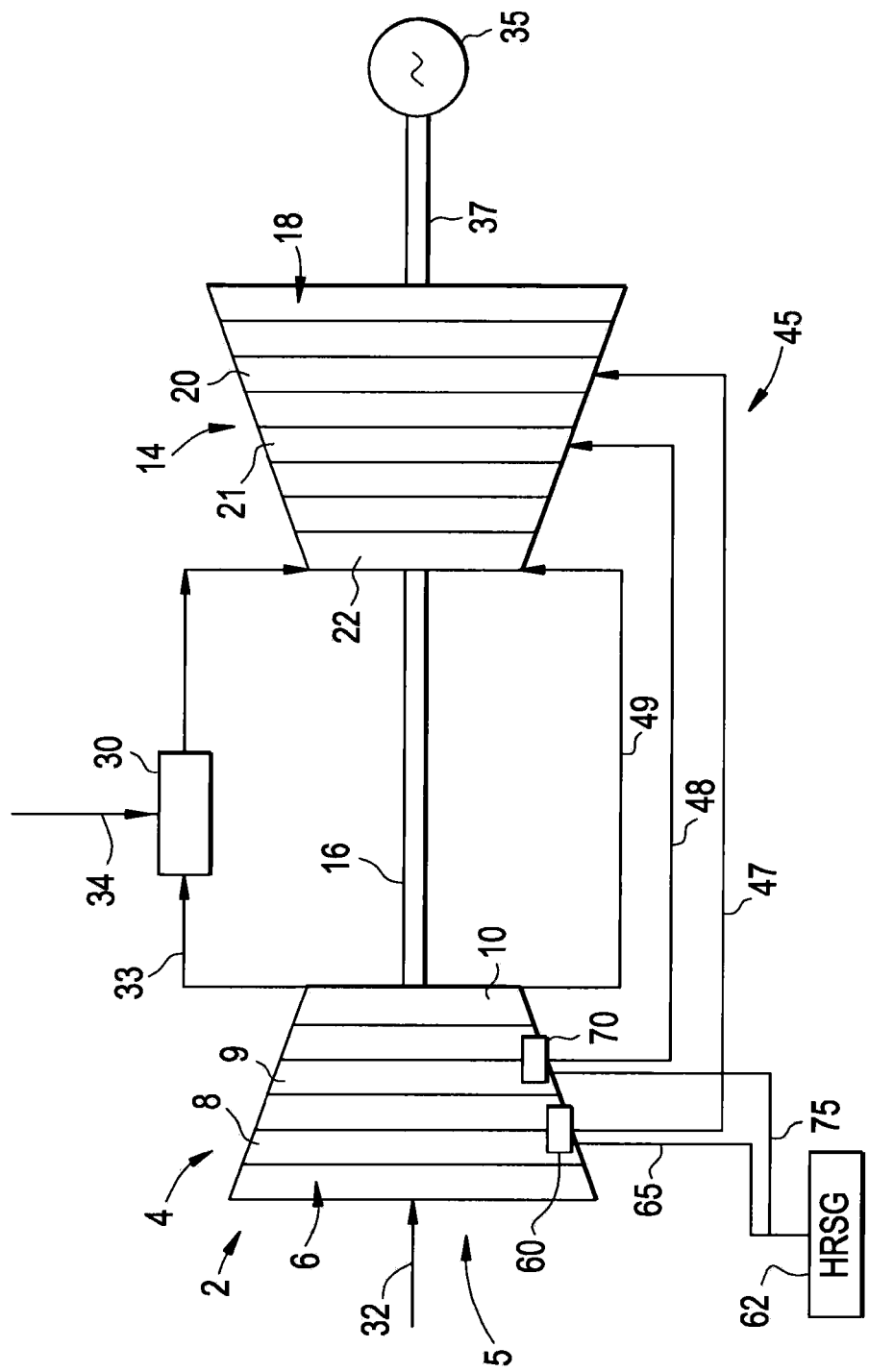
FIG. 1 is a schematic view of a turbomachine constructed in accordance with exemplary embodiments of the present invention.

With initial reference to FIG. 1, a turbomachine constructed in accordance with exemplary embodiments of the present invention is indicated generally at 2. As shown, turbomachine 2 includes a compressor portion 4 having a main flow path 5 and a plurality of compressor stages 6. Compressor stages 6 include at least a low pressure stage 8, a mid-pressure stage 9, and a high pressure stage 10. Compressor portion 4 is operatively connected to a turbine portion 14 via a shaft 16. Turbine portion 14 includes a plurality of turbine stages 18 having at least a low pressure stage 20, a mid-pressure stage 21, and a high pressure stage 22. Compressor portion 4 is also linked to turbine portion 14 through a combustor 30.

In operation, compressor portion 4 receives and compresses ambient air 32 to form a compressed air flow. A portion of the compressed air flow 33 is directed to combustor 30 to mix with fuel 34 and ignited to form a high temperature/high pressure air stream that is delivered to turbine portion 14. The high temperature/high pressure air stream is utilized, in combination with compressed air from compressor portion 4 to drive turbine portion 14. Turbine portion 14 in turn drives a generator 35 via a shaft 37. In operation, high temperatures develop within turbine portion 14 raising temperatures of hot gas path (HGP) components (not shown). In order to lessen the high temperatures at the HGP components, cooling air is extracted from compressor portion 4 and injected into turbine portion 14. While necessary for cooling, employing compressed air as a cooling medium is less than efficient. That is, as the compressed air is not used in combustion and thus subsequently to drive turbine portion 14, any work put into compressing the cooling air is wasted or at best utilized at a much lower efficiency. In order to lower any efficiency losses associated with employing compressed air for cooling, turbomachine 2 includes a secondary fluid injection system which, in accordance with the exemplary embodiment, takes the form of a steam injection system 45.

Steam injection system 45 includes a first conduit 47 that fluidly connects low pressure compressor stage 8 with low pressure turbine stage 20, a second conduit 48 that fluidly connects mid-pressure compressor stage 9 with mid-pressure turbine stage 21, and a third conduit 49 that fluidly connects high pressure compressor stage 10 with high pressure turbine stage 22. Steam injection system 45 also includes a first injector port 60. In accordance with the exemplary embodiment shown, first injector port 60 is mounted on an upstream end of first conduit 47. More specifically, first injector port 60 is mounted to compressor portion 4 at low pressure stage 8. First injector port 60 is fluidly connected to a steam generation system which, in accordance with the embodiment shown, is part of a heat recovery steam generator (HRSG) 62 via a conduit 65. HRSG 62 utilizes a low grade heat for steam generation. Steam injection system 45 further includes a second injector port 70 fluidly connected to HRSG 62 via a conduit 75. Second injector port 70 is mounted to compressor portion 4 at mid-pressure stage 9.

With this arrangement, a dry secondary fluid, such as dry saturated steam or superheated steam is injected into injection port 60 and/or injection port 70 to mix with compressor cooling air passing to turbine portion 14. By "dry" it is meant that the secondary fluid contains a zero or no moisture. The dry secondary fluid replaces a portion of the compressor cooling air. In this manner, compressor portion 4 is no longer required to produce as much cooling air and thus efficiency losses are minimized. Also, as a pound of steam is approximately equivalent to 2.25 lbs of cooling air given steam's specific heat capacity, thus a lower amount of steam, can produce the same cooling effects at turbine portion 14 and the amount of work required by compressor portion 4 to meet the cooling air needs of turbine portion 14 is thereby further reduced. In addition, when using steam, a higher thermal conductivity also improves heat transfer from turbine portion 14. Moreover, a higher thermal conductivity of superheated steam improves heat transfer from turbine portion 14 thereby producing an enhanced cooling effect.

Figure 2:
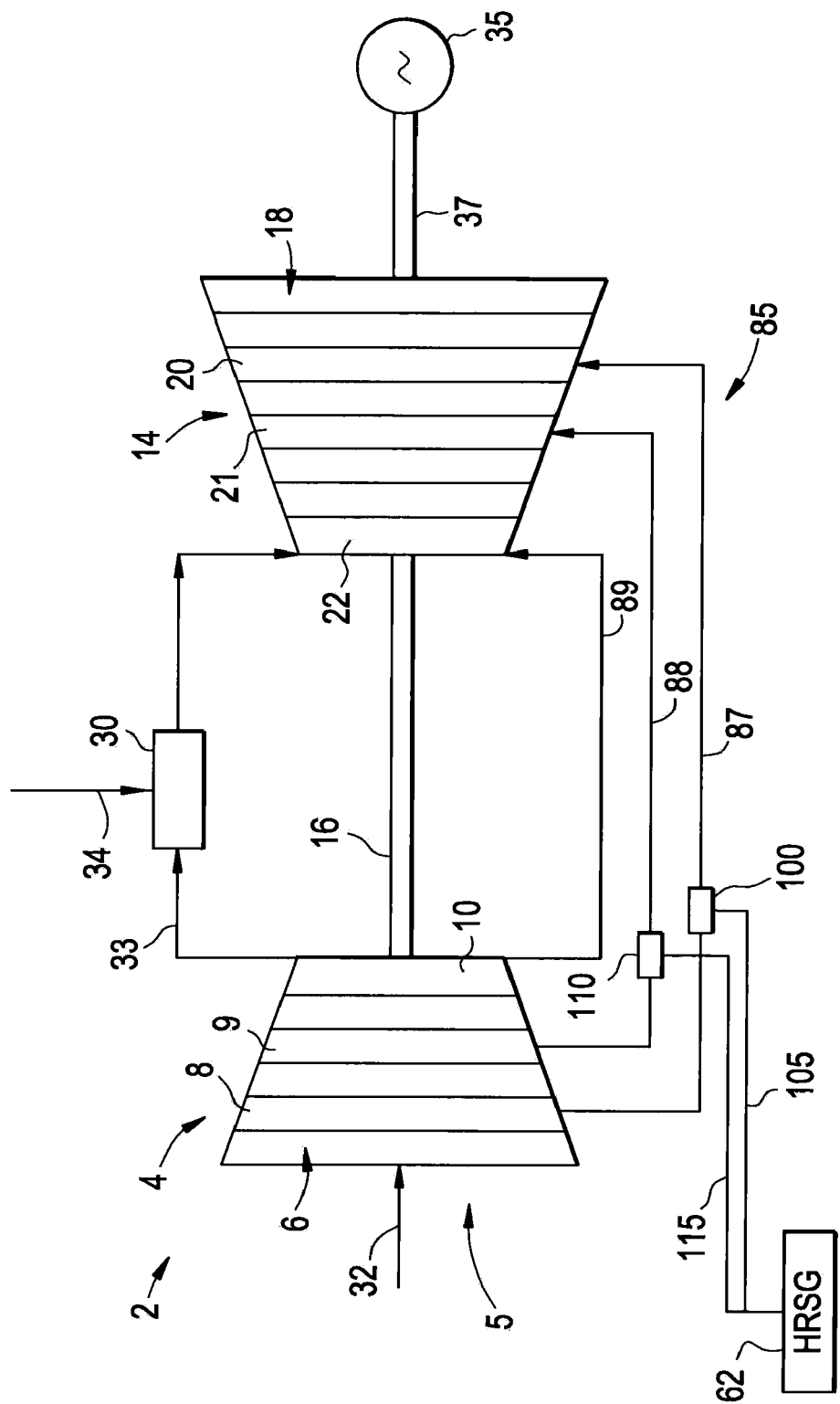
FIG. 2 is a schematic view of a turbomachine constructed in accordance with another exemplary embodiment of the present invention.

Reference will now be made to FIG. 2, where like reference numbers represent corresponding parts in the respective views, in describing a secondary fluid injection system, which in accordance with a second exemplary embodiment takes the form of a steam injection system 85. As shown, steam injection system 85 includes a first conduit 87 that fluidly connects low pressure compressor stage 8 with low pressure turbine stage 20, a second conduit 88 that fluidly connects mid-pressure compressor stage 9 with mid-pressure turbine stage 21, and a third conduit 89 that fluidly connects high pressure compressor stage 10 with high pressure turbine stage 22. Steam injection system 85 also includes a first injector port 100. In accordance with the exemplary embodiment shown, first injector port 100 is mounted along first conduit 87. More specifically, first injector port 100 is mounted downstream of compressor portion 4. First injector port 100 is fluidly connected to HRSG 62 via a conduit 105. Steam injection system 85 further includes a second injector port 110 fluidly connected to HRSG 62 via a conduit 115. Second injector port 110 is mounted along conduit 88 downstream of compressor portion 4. In a manner similar to that described above, a dry secondary fluid such as dry saturated steam or superheated steam is injected into first injector port 100 and/or second injector port 110 to mix with and replace a portion of cooling air generated by compressor portion 4 to enhance power efficiency.

Figure 3:
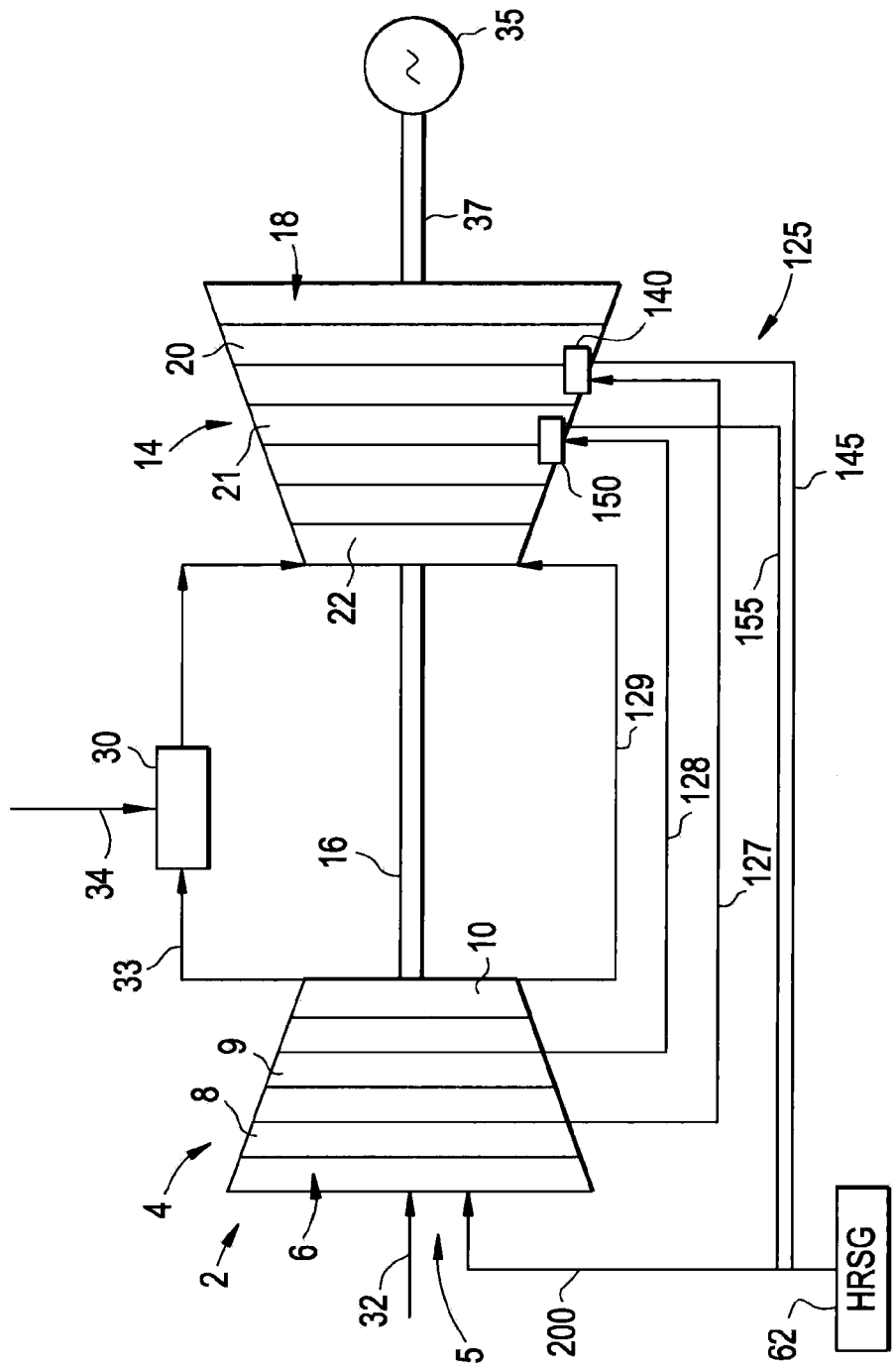
FIG. 3 is a schematic view of a turbomachine constructed in accordance with yet another embodiment of the present invention.

Reference will now be made to FIG. 3, where like reference numbers represent corresponding parts in the respective views, in describing a secondary fluid injection system which in accordance with another exemplary embodiment, takes the form of a steam injection system 125 constructed in accordance with another exemplary embodiment of the present invention Steam injection system 125 includes a first conduit 127 that fluidly connects low pressure compressor stage 8 with low pressure turbine stage 20, a second conduit 128 that fluidly connects mid-pressure compressor stage 9 with mid-pressure turbine stage 21, and a third conduit 129 that fluidly connects high pressure compressor stage 10 with high pressure turbine stage 22. Steam injection system 125 also includes a first injector port 140.

In accordance with the exemplary embodiment shown, first injector port 140 is mounted at a downstream end of first conduit 127. More specifically, first injector port 140 is mounted to turbine portion 14 at a terminal end of first conduit 127. First injector port 140 is fluidly connected to HRSG 62 via a conduit 145. Steam injection system 125 further includes a second injector port 150 fluidly connected to HRSG 62 via a conduit 155. Second injector port 150 is mounted to turbine portion 14 at mid-pressure stage 9. In a manner also similar to that described above, a dry secondary fluid, such as dry saturated steam or superheated steam is injected into first injector port 140 and/or second injector port 150 to mix with and replace a portion of cooling air generated by compressor portion 4. As discussed above, by reducing the amount of cooling air required to be extracted from compressor portion 4, more work is input into driving turbine portion 14 thereby enhancing an overall efficiency of turbomachine 2. As discussed above, by reducing the amount of cooling air drawn from compressor portion 4, useful work lost to produce compression is minimized and net work output available from turbine portion 14 at shaft 37 is increased thereby enhancing an overall efficiency of turbomachine 2.

In addition to supplementing cooling air, the dry secondary fluid can be injected directly or indirectly into main flow path 5 of compressor portion 4 such as indicated at 200 in FIG. 3. More specifically, the dry secondary fluid is injected at a point where specific volume, as well as temperature, of the dry secondary fluid is less than corresponding compressor parameters. The injection of pressurized secondary fluid saves compression work that would otherwise been required to raise fluid pressures to injection point level. Steam' lower specific volume relative to air ensures lesser compression work per unit mass of mixture at post injection. Lower temperature enables compressed air cooling without rejecting heat out of the thermodynamic cycle. This further reduces the extraction cooling flows due to an availability of low temperature air with subsequent higher heat removal capacity due to lower mixture temperatures. The dry secondary fluid is injected at a point where fluid pressure is sufficient to establish a positive mass flow gradient. In simple cycle systems, injection takes place close to but upstream from a compressor discharge point (not separately labeled) thus further minimizing any compression work required by compressor portion 4. That is, injection takes place at a point that close but upstream from the compressor discharge while still satisfying a positive gradient requirement necessary to introduce the secondary fluid.

At this point it should be appreciated that the present invention provides a turbomachine having a secondary fluid injection system that is configured to enhance power output efficiencies. As described above, it should be appreciated that a dry secondary fluid, such as dry saturated steam or superheated steam can be injected before, at or after cooling air extraction points on compressor portion 4 as well as immediately before or at the turbine portion. The dry secondary fluid can also be injected in piping that transports turbine cooling air from the compressor portion to the turbine portion. The particular location of fluid injection is dependent upon back pressure requirements which vary between turbine models. In addition, it should be understood that the source and type of dry secondary fluid can vary.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A turbomachine comprising:
a compressor portion generating a cooling airflow, the compressor portion including a plurality of compressor stages and a compressor discharge;
a turbine portion operatively connected to the compressor portion, the turbine portion including a plurality of turbine stages;
a conduit fluidly connecting at least one of the plurality of compressor stages with at least one of the plurality of turbine stages, the conduit delivering a portion of the cooling airflow from the compressor portion to the turbine portion;
an injector port fluidly connected to the conduit;
a steam generation system fluidly connected to the injector port and the compressor portion, the steam generation system delivering an amount of dry steam into the cooling airflow passing from the compressor portion to the turbine portion and an additional amount of dry steam into the compressor portion upstream from the compressor discharge, the amount of dry steam and additional amount of dry steam replacing a portion of the cooling air passing to the turbine portion thereby lowering an amount of work required by the compressor portion needed for supplying cooling air.

2. The turbomachine according to claim 1, wherein the injector port is positioned upstream of the conduit.

3. The turbomachine according to claim 1, wherein the injector port is positioned in the conduit.

4. The turbomachine according to claim 1, where the injector port is positioned down stream of the conduit.

5. The turbomachine according to claim 1, wherein the compressor portion includes a main flow path fluidly connected to the steam generation system, wherein the additional amount of steam is injected into the main flow path.

6. The turbomachine according to claim 1, wherein the steam generation system is part of a heat recovery steam generator.

7. The turbomachine according to claim 6, wherein the amount of dry steam constitutes dry saturated steam.

8. The turbomachine according to claim 6, wherein the amount of dry steam constitutes superheated steam.

9. A method of enhancing power efficiency in a turbomachine, the method comprising:
operating a compressor portion of the turbomachine to generate a cooling airflow, the compressor portion having a plurality of compressor stages;
extracting the cooling airflow from one of the plurality of stages of the compressor portion;
directing the cooling airflow into a turbine portion of the turbomachine; and
injecting an amount of dry steam into the cooling airflow and an additional amount of dry steam into the compressor portion upstream of a compressor discharge, the amount of dry steam replacing a portion of the cooling airflow and the additional amount of dry steam replacing compressed air thereby lowering an amount of work required by the compressor portion needed for cooling the turbine portion and thus enhancing power efficiency of the turbomachine.

10. The method of claim 9, wherein the amount of dry steam is injected into the cooling airflow in the turbine portion of the turbomachine.

11. The method of claim 9, wherein the amount of dry steam is injected into a conduit fluidly connecting the compressor portion and the turbine portion.

12. The method of claim 9, further comprising: injecting the additional amount of dry steam into a main flow path of the compressor portion.

13. The method of claim 9, wherein injecting the amount of dry steam comprises injecting a dry saturated steam into the cooling airflow.

14. The method of claim 9, wherein injecting the amount of dry steam comprises injecting superheated steam into the cooling airflow.

15. The method of claim 9, further comprising: injecting the amount of dry steam into a main flow path of the compressor portion.

* * * * *